(12) United States Patent
Benzoni et al.

(10) Patent No.: US 6,847,748 B2
(45) Date of Patent: Jan. 25, 2005

(54) HEAT SINK FOR A PLANAR WAVEGUIDE SUBSTRATE

(75) Inventors: Albert M. Benzoni, South Pasadena, CA (US); Mark D. Downie, Pasadena, CA (US)

(73) Assignee: Xponent Photonics Inc, Monrovia, CA (US)

( * ) Notice: Subject to any disclaimer, the term of this patent is extended or adjusted under 35 U.S.C. 154(b) by 0 days.

(21) Appl. No.: 10/671,244

(22) Filed: Sep. 24, 2003

(65) Prior Publication Data

US 2004/0071388 A1 Apr. 15, 2004

Related U.S. Application Data

(60) Provisional application No. 60/418,450, filed on Oct. 15, 2002.

(51) Int. Cl.⁷ .................................. G02B 6/12
(52) U.S. Cl. .............................. 385/14; 385/88; 385/129
(58) Field of Search ............................. 385/14, 88–94, 385/129; 257/679, 691, 706, 675; 438/106

(56) References Cited

U.S. PATENT DOCUMENTS 5,646,444 A * 7/1997 Bartlett et al. ............... 257/706
5,822,848 A * 10/1998 Chiang ........................ 438/106

OTHER PUBLICATIONS

International Search Report—App. No. PCT/US03/30205 mailed Jul. 2, 2004 (four sheets total).

* cited by examiner

Primary Examiner—Phan T. H. Palmer
(74) Attorney, Agent, or Firm—David S. Alavi; Christie Parker & Hale LLP

(57) ABSTRACT

A recessed area formed on a substrate surface is filled with heat sink material to form a heat sink. The heat sink material has thermal conductivity greater than that of the substrate. The heat sink may have a substantially flat surface substantially flush with the substrate surface. The substrate may further include: a planar optical waveguide formed thereon positioned for optical coupling with an optical device mounted on the substrate in thermal contact with the heat sink; and/or an electrical contact layer formed thereon positioned for establishing electrical continuity with an optical device mounted on the substrate in thermal contact with the heat sink. The electrical contact may also provide thermal contact between the device and heat sink. The substrate may further include a low-index optical buffer layer formed on its surface. Materials for the substrate, buffer layer, and heat sink may include silicon, silica, and diamond, respectively.

32 Claims, 4 Drawing Sheets

HEAT SINK FOR A PLANAR WAVEGUIDE SUBSTRATE

RELATED APPLICATIONS

This application claims benefit of U.S. provisional App. No. 60/418,450 entitled "Heat sink for a planar waveguide substrate" filed Oct. 15, 2002 in the names of Albert M. Benzoni and Mark D. Downie, said provisional application being hereby incorporated by reference as if fully set forth herein.

BACKGROUND

The field of the present invention relates to planar waveguide substrates. In particular, heat sinks are described herein for facilitating heat dissipation on such substrates.

Planar optical waveguides are suitable for implementing a variety of optical devices for use in telecommunications and other fields. In addition to the planar waveguides, the planar waveguide substrate often also includes (by fabrication, formation, and/or mounting thereon): alignment/support structures for placement of optical devices on the substrate; V-grooves and/or other alignment/ support structures for positioning of optical fibers and/or fiber-optic tapers on the substrate; compensators, gratings, and/or other optical devices on the substrate; electrical contacts and/or traces for enabling electronic access to active devices on the substrate; and/or other suitable components.

Silicon is a common substrate material for implementing planar optical waveguides, for a variety of reasons discussed further hereinbelow. For many examples of planar-waveguide-based optical devices, thermal conductivity of silicon substrates (typically single-crystal silicon substrates) is adequate. However, in certain instances the thermal conductivity of a silicon planar waveguide substrate may not be adequate for dissipating heat generated by devices and/or components on the substrate. In particular, FIG. 1 illustrates an example of an optical device 110 (on a device substrate 111 and including an external-transfer waveguide 112 in this example) surface-mounted on a planar waveguide substrate 102 for optical coupling to a planar waveguide 120 formed on the substrate. Active optical device 110 may be a laser or other optical source, an optical modulator, or other optical device or component that generates heat in the course of its operation. Substrate 102 may often include a low-index buffer layer 104 below waveguide 120. Alignment/support structures for positioning device 110 on substrate 102 are omitted for clarity. Substrate 102 is provided with an electrical trace and electrical contact 122 for establishing electrical continuity with corresponding contact 113 on device 110 after assembly (additional traces and/or contacts may be provided on substrate 102, or additional electrical access may be provided directly to device 110). In many active devices, relatively large amounts of heat may be generated in active regions of the optical device, particularly if relatively large drive currents are required. A primary route for dissipation of this heat is out into the substrate through the area of the electrical contact (indicated by the arrows in FIG. 1). For a variety of reasons, including providing high electronic bandwidth and conserving substrate area, the area of contact between the device and the substrate through the contact often may be made as small as practicable. The small area for heat dissipation and the moderate thermal conductivity of the silicon substrate may therefore result in inadequate heat dissipation and potential overheating of the device. It is therefore desirable to provide a planar waveguide substrate, particularly a silicon planar waveguide substrate, having enhanced thermal conductivity properties for dissipating heat from surface-mounted optical devices.

SUMMARY

A substrate includes a recessed area or pit formed on the substrate surface, and heat sink material substantially filling the recessed area to form a heat sink. The heat sink material has thermal conductivity greater than that of the substrate. The heat sink may have a substantially flat surface substantially flush with the surface of the substrate. Polishing may be employed for forming substantially flush substrate and heat sink surfaces. The substrate may further include a planar optical waveguide formed on the substrate and positioned so as to establish optical coupling with an optical device mounted on the substrate in thermal contact with the heat sink. The substrate may further include an electrical contact layer formed on the substrate and positioned so as to establish electrical continuity with an optical device mounted on the substrate in thermal contact with the heat sink. The electrical contact may be positioned on the surface of the heat sink and also provide thermal contact, and solder may be employed for enhancing and securing electrical continuity and/or thermal contact with the device. The substrate may further include a low-index optical buffer layer formed on its surface; the surface of the optical buffer layer may be substantially flush with the heat sink. Materials for the substrate, buffer layer, and heat sink may include (but are not limited to): silicon, silica, and diamond, respectively.

Objects and advantages pertaining to a planar waveguide substrate with a heat sink may become apparent upon referring to the disclosed exemplary embodiments as illustrated in the drawings and set forth in the following written description and/or claims.

It should be noted that the relative proportions of various structures shown in the Figures may be distorted to more clearly illustrate the present invention. Relative dimensions of various devices, waveguides, heat sinks, electrical contacts, and so forth may be distorted, both relative to each other as well as in their relative transverse and/or longitudinal proportions. In many of the Figures the thicknesses of various layers may be exaggerated for clarity.

The embodiments shown in the Figures are exemplary, and should not be construed as limiting the scope of the present invention as disclosed and/or claimed herein.

DETAILED DESCRIPTION OF PREFERRED AND ALTERNATIVE EMBODIMENTS

Figure 1:
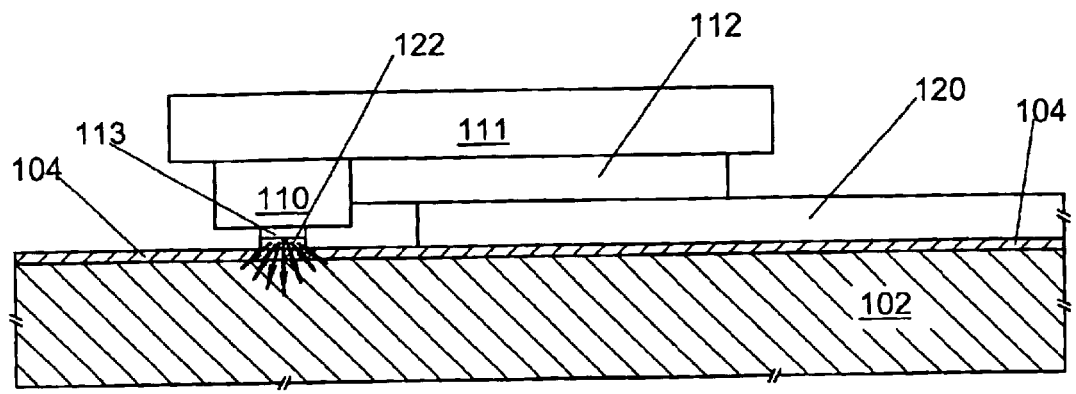
FIG. 1 is a side view of an optical device mounted on a planar waveguide substrate without a heat sink.
Figure 2:
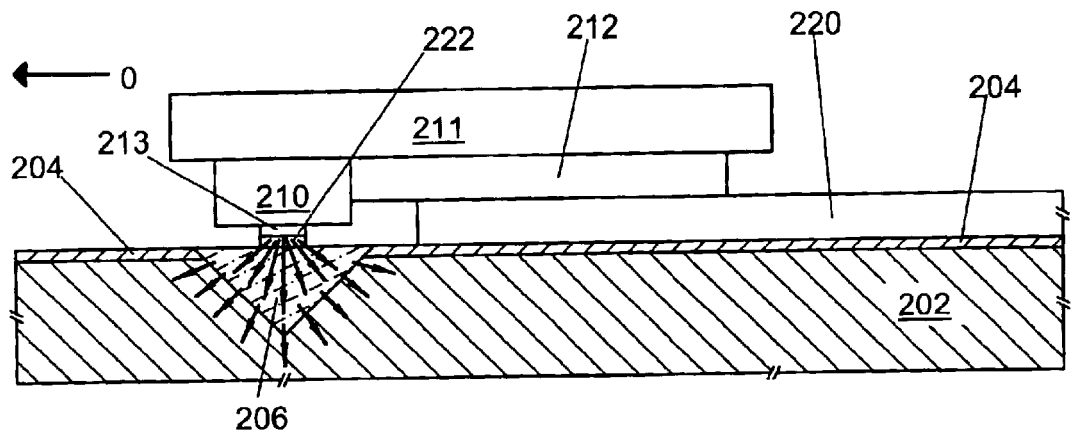
FIG. 2 is a side view of an optical device mounted on a planar waveguide substrate with a heat sink according to the present invention.

FIG. 2 shows an optical device mounted on a planar waveguide substrate with a heat sink according to the present invention. A silicon substrate 202 is provided with an optical buffer layer 204 and a heat sink 206. A planar waveguide 220 is formed on substrate 202 (with optical buffer layer 204 therebetween). An electrical contact 222 (typically Ti—Pt—Au several hundred nm thick; other suitable materials or material combinations may be equivalently employed) is formed on substrate 202 over portions of the buffer layer 204 and the heat sink 206. Heat sink 206 comprises material of greater thermal conductivity than substrate 202. An optical device 210 (on a device substrate 211 and including an external-transfer waveguide 212 in this example) is mounted on the planar waveguide substrate 202 (at least partially over heat sink 206) so as to establish electrical continuity with contact 222 (through device contact 213, typically Ti—Pt—Au; other materials or material combinations may be equivalently employed), and so as to establish optical power transfer with planar waveguide 220 (through external-transfer waveguide 212). During fabrication of contact layer 222 and/or 213, a layer of solder a few $\mu$m thick may be deposited thereon (not shown). After mechanical assembly of device 210 onto waveguide substrate 202, solder re-flow may be employed for forming a mechanical bond between contacts 213/222, thereby also securing and enhancing thermal conduction and electrical continuity therebetween. Alternatively, thermo-compression bonding may be employed for securing together contacts 213/222. Heat generated within device 210 flows (as indicated by the arrows in FIG. 2) through contact 213, the solder, and a portion of the area of contact layer 222, and spreads into heat sink 206 and thence into substrate 202. In contrast to the situation depicted in FIG. 1, in FIG. 2 heat flows from device 210 into the surface of heat sink 206 and more rapidly spreads into the volume of heat sink 206, due to its greater thermal conductivity. The surface area of the boundary between heat sink 206 and substrate 202 is substantially larger than the surface area of contact between device 210 and heat sink 206 (or the area of contact between device 110 and substrate 102 in FIG. 1), so that heat may more rapidly spread away from device 210 in spite of the only moderate conductivity of substrate 202. Heat sink 206 is provided on substrate 202 with sufficiently intimate contact across the material boundary so as to enable adequate heat flow across the boundary.

Figure 3:
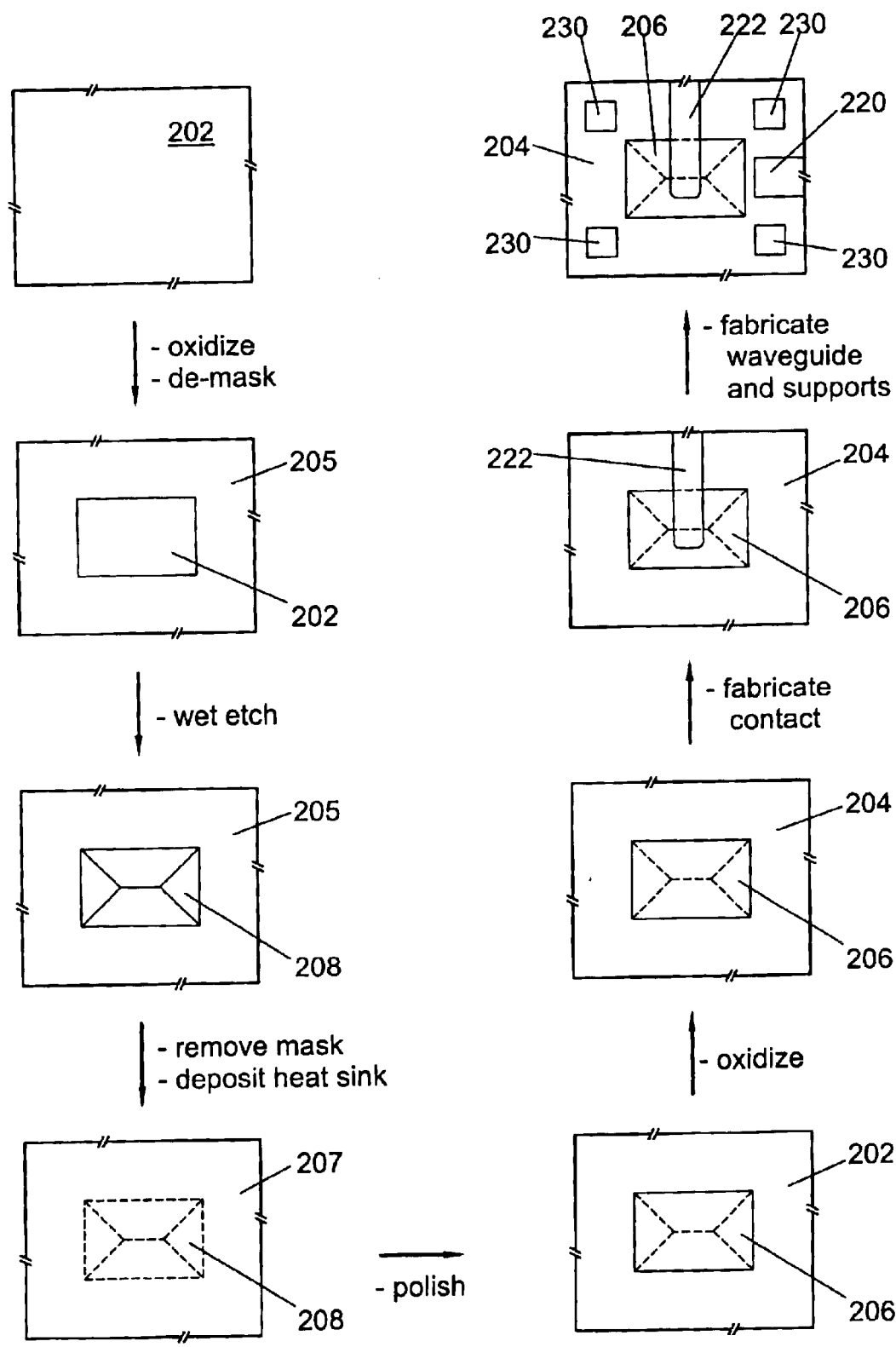
FIGS. 3 and 4 are top and side views, respectively, of a process diagram for providing a planar waveguide substrate with a heat sink according to the present invention.
Figure 4:
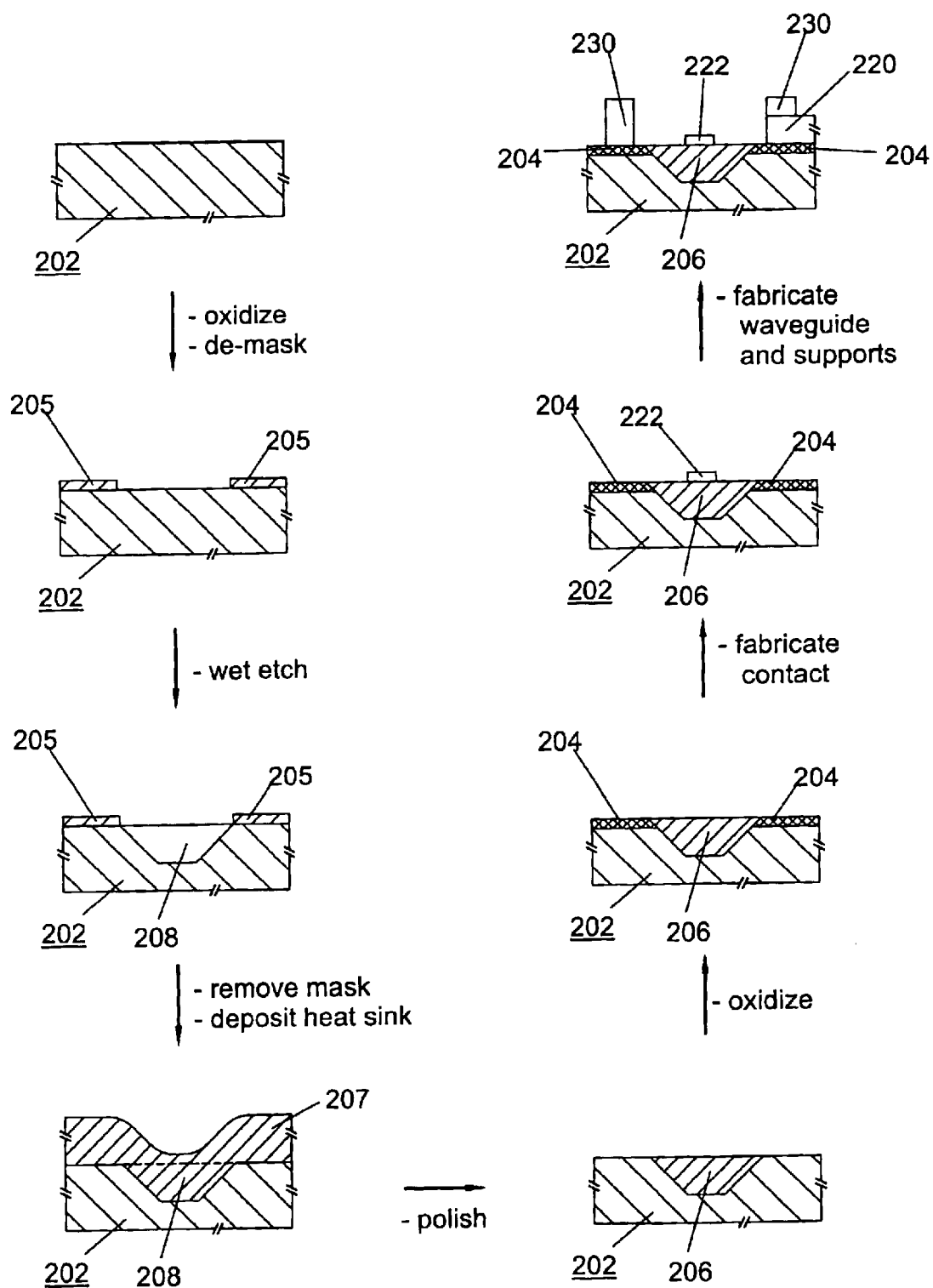

FIGS. 3 and 4 illustrate an exemplary process for providing heat sink 206 in planar waveguide substrate 202. A substrate 202 (single crystal silicon in this example; other substrate materials may be employed) is spatially selectively etched to provide a recessed area or pit 208. The recessed area is formed in this example by a masked wet etching process along crystallographic planes within the single crystal substrate. The mask may be provided by oxidation of the silicon substrate to form a substantially uniform mask layer 205 or deposition of a substantially uniform mask layer 205, followed by spatially selective removal of portions of the mask layer (i.e., spatially selective de-masking). The size and shape of the de-masked areas, the crystal geometry, the etchant employed, and the etch time determine the final size and geometry of pit 208. Once the pit or recessed area 208 has been etched, the mask layer 205 may be removed, and a layer 207 of heat sink material may be deposited on substrate 202 and pit 208. A diamond film provided by chemical vapor deposition (CVD) is a suitable heat sink material. The deposition of the heat sink layer (i.e., the diamond layer in this example) continues until pit 208 is sufficiently filled with heat sink material, typically when the heat sink layer thickness reaches or exceeds the depth of recessed area 208. It may be desirable, before removing the mask layer 205, to treat the substrate 202 to facilitate deposition of the heat sink layer within pit 208, for example, by nucleation enhancement using diamond powder. After the heat sink layer 207 is deposited, substrate 202 is polished, along with heat sink layer 207, to remove most of the heat sink layer, leaving the portion within pit 208. The portion of the heat sink layer that remains within pit 208 after polishing becomes heat sink 206. Substrate 202 and heat sink 206 are polished to the required flatness for subsequent fabrication of planar waveguides, electrical contacts, and other structures on the planar waveguide substrate 202 with heat sink 206.

Once polished to the required flatness, planar waveguide substrate 202 with heat sink 206 may be further processed if needed or desired. Exposed portions of substrate 202 (surrounding heat sink 206) may be oxidized to a desired depth to form a low-index optical buffer layer 204. One or more planar waveguides 220 and one or more electrical contacts/traces 222 may then be formed by any suitable spatially selective processing techniques, along with one or more support/alignment structures 230 and/or other structures/components on substrate 202. Solder may be spatially-selectively deposited (not shown) for securing a device during subsequent assembly. Heat sink 206 may be positioned very precisely relative to planar waveguide 220 and any other structures fabricated on substrate 202 by using any suitable spatially selective material processing technique(s). Once assembled onto planar waveguide substrate 202 in contact with contact 222, optical device 210 may readily dissipate heat through the area of contact with contact 222 into heat sink 206 and thence into substrate 202 (FIG. 2).

In an alternative processing scheme for a silicon substrate, an oxidized mask layer 205 (i.e., a silica mask layer) may be left on the substrate 202 (after etching pit 208) and the heat sink layer 207 deposited thereon. The substrate, mask, and heat sink may then be polished until the mask layer is reached. The remaining portion of the heat sink layer forms heat sink 206, while the remaining portion of the silica mask layer 205 may then serve as buffer layer 204. Pre-oxidized substrate material may be readily obtained as the starting material, and the mask-removal and buffer layer-providing steps are eliminated, thereby reducing the steps required for fabricating the waveguide substrate with a heat sink.

Contact between silicon substrate material and diamond heat sink material sufficiently intimate for enabling adequate heat flow therebetween may be enabled by spatially selective etching of pit 208 along crystal planes of the substrate (resulting in a nearly atomically smooth boundary surface) and chemical vapor deposition of the diamond layer 208 (resulting in a dense layer substantially free of voids, either within the layer or between the layer and the substrate). However, other combinations of materials and/or processing techniques (including techniques not necessarily restricted to crystal planes of the substrate) may be employed for providing an adequate degree of intimate contact for enabling adequate heat flow between the substrate and the heat sink, while remaining within the scope of the present invention. While specific substrates (silicon), spatially selective processing techniques (wet etching), and heat sink layer material and deposition (CVD-deposited diamond) have been shown in the foregoing exemplary embodiment, the present invention is by no means restricted to these materials and/or techniques. Any suitable planar waveguide substrate material may be employed (including but not limited to: silica waveguides on a silicon substrate with a silica optical buffer layer; silicon waveguides on a silicon substrate with a silica buffer layer or on a silica substrate; and/or any of the other examples enumerated hereinabove), and may be spatially selectively processed in any suitable way for producing pits or recessed areas (including but not limited to exemplary processes enumerated hereinabove). Any heat sink material may be employed provided that it: possess thermal conductivity greater than that of the planar waveguide substrate material; may be deposited on the substrate material in sufficiently intimate contact therewith; and may be polished to a degree of surface flatness comparable to that achievable for the substrate. Examples of suitable materials may include but are not limited to: diamond, aluminum nitride, beryllium oxide, cubic boron nitride.

While the surface of the heat sink and the surface of the substrate (or an optical buffer layer thereon) are shown substantially flush in the exemplary embodiments, the present invention may also be implemented with these surfaces at differing heights. For subsequent processing and/or assembly steps to be accurately performed, any difference in height should preferably be accurately known and accounted for. While thermal contact in the exemplary embodiments is provided through the electrical contact (typically soldered), in some circumstances it may be desirable to provide thermal contact at a location separate from the electrical contact. Such alternative configurations nevertheless fall within the scope of the present disclosure and/or appended claims.

Figure 5:
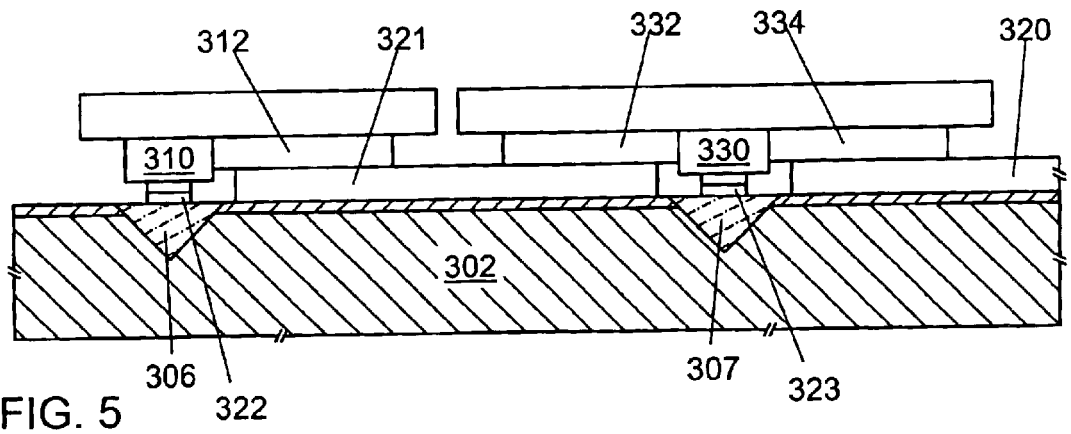
FIG. 5 is a side view of multiple optical devices mounted on a planar waveguide substrate with multiple heat sinks according to the present invention.
Figure 6:
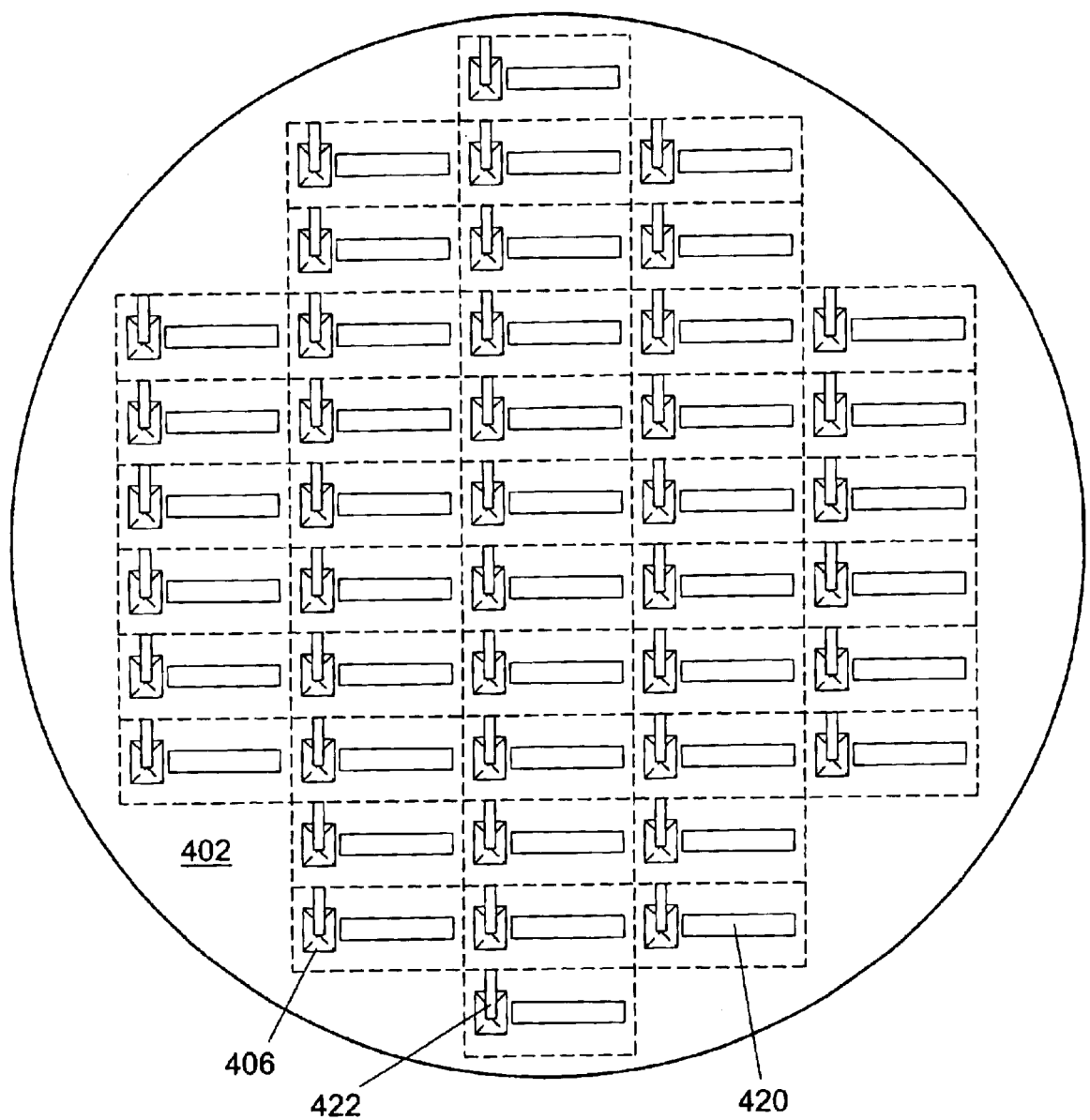
FIG. 6 illustrates wafer-scale processing of many heat sinks and planar waveguides on a single substrate according to the present invention.

Multiple heat sinks according to the present invention may be provided on a single planar waveguide substrate for dissipating heat from multiple individual optical devices mounted thereon to form a composite optical device of some sort. FIG. 5 shows an example of a laser source 310 and a modulator 330 separately assembled onto a planar waveguide substrate 302 and optically coupled to planar optical waveguides 320 and 321 (by transverse transfer of optical power with external transfer waveguides 312, 332, and 334 in this example). Electrical contacts 322 and 323 provide electrical access for powering/controlling laser 310 and modulator 330, respectively. Heat sinks 306 and 307 are provided for dissipating heat produced by laser 310 and modulator 330, respectively. Heat sinks 306 and 307 may be positioned very precisely relative to one another and relative to planar waveguides 320 and 321 and any other structures fabricated on substrate 302 by using any suitable spatially selective material processing technique(s). Spatially selective material processing techniques may also be implemented on a wafer scale for providing many heat sinks 406 (dozens, hundreds, perhaps thousands; FIG. 6) on a single wafer 402. After further wafer scale processing to form other desired structures (including planar waveguides 420 and electrical contacts 422 in this example), the planar waveguide substrate may be divided (along the dotted lines in FIG. 6, for example) into device substrates, each having one or more heat sinks 406, one or more electrical contacts 422, one or more planar waveguides 420, and/or one or more other structures. Each device substrate may have assembled thereon one or more optical devices, in thermal contact with a heat sink 406, in electrical contact with contact 422, and/or optically coupled to a planar waveguide 420. Such wafer scale processing for fabricating many device substrates (with heat sinks) on a single wafer yields significant economies of manufacture.

For purposes of the foregoing written description and/or the appended claims, the term "optical waveguide" (or equivalently, "waveguide" or "transmission optical element") as employed herein shall denote a structure adapted for supporting one or more optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may therefore vary along the length of a curvilinear waveguide, for example. Examples of optical waveguides may include, without being limited to, various types of optical fiber and various types of planar waveguides. The term "planar optical waveguide" (or equivalently, "planar waveguide") as employed herein shall denote any optical waveguide that is formed on a substantially planar substrate. The longitudinal dimension (i.e., the propagation dimension) shall be considered substantially parallel to the substrate. A transverse dimension substantially parallel to the substrate may be referred to as a lateral or horizontal dimension, while a transverse dimension substantially perpendicular to the substrate may be referred to as a vertical dimension. Examples of such waveguides include ridge waveguides, buried waveguides, semiconductor waveguides, other high-index waveguides ("high-index" being above about 2.5), silica-based waveguides, polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, waveguides incorporating non-linear-optical (NLO) materials, and myriad other examples not explicitly set forth herein which may nevertheless fall within the scope of the present disclosure and/or appended claims. Many suitable substrate materials may be employed, including semiconductor, crystalline, silica or silica-based, other glasses, ceramic, metal, and myriad other examples not explicitly set forth herein which may nevertheless fall within the scope of the present disclosure and/or appended claims.

One exemplary type of planar optical waveguide that may be suitable for use with optical components disclosed herein is a so-called PLC waveguide (Planar Lightwave Circuit). Such waveguides typically comprise silica or silica-based waveguides (often ridge or buried waveguides; other waveguide configuration may also be employed) supported on a substantially planar silicon substrate (often with an interposed silica or silica-based optical buffer layer). Sets of one or more such waveguides may be referred to as planar waveguide circuits, optical integrated circuits, or opto-electronic integrated circuits. A PLC substrate with one or more PLC waveguides may be readily adapted for mounting one or more optical sources, lasers, modulators, and/or other optical devices adapted for end-transfer of optical power with a suitably adapted PLC waveguide. A PLC substrate with one or more PLC waveguides may be readily adapted (according to the teachings of U.S. patent application Ser. No. 2003/0081902 and/or U.S. App. No. 60/466,799, for example) for mounting one or more optical sources, lasers, modulators, photodetectors, and/or other optical devices adapted for transverse-transfer of optical power with a suitably adapted PLC waveguide (mode-interference-coupled, or substantially adiabatic, transverse-transfer; also referred to as transverse-coupling).

For purposes of the foregoing written description and/or appended claims, "spatially-selective material processing techniques" shall encompass epitaxy, layer growth, lithography, photolithography, evaporative deposition, sputtering, vapor deposition, chemical vapor deposition, beam deposition, beam-assisted deposition, ion beam deposition, ion-beam-assisted deposition, plasma-assisted deposition, wet etching, dry etching, ion etching (including reactive ion etching), ion milling, laser machining, spin deposition, spray-on deposition, electrochemical plating or deposition, electroless plating, photo-resists, UV curing and/or densification, micro-machining using precision saws and/or other mechanical cutting/shaping tools, selective metallization and/or solder deposition, chemical-mechanical polishing for planarizing, any other suitable spatially-selective material processing techniques, combinations thereof, and/or functional equivalents thereof. In particular, it should be noted that any step involving "spatially-selectively providing" a layer or structure may involve either or both of: spatially-selective deposition and/or growth, or substantially uniform deposition and/or growth (over a given area) followed by spatially-selective removal. Any spatially-selective deposition, removal, or other process may be a so-called direct-write process, or may be a masked process. It should be noted that any "layer" referred to herein may comprise a substantially homogeneous material layer, or may comprise an inhomogeneous set of one or more material sub-layers. Spatially-selective material processing techniques may be implemented on a wafer scale for simultaneous fabrication/processing of multiple structures on a common substrate wafer.

It should be noted that various components, elements, structures, and/or layers described herein as "secured to", "connected to", "mounted on", "deposited on", "formed on", "positioned on", etc., a substrate may make direct contact with the substrate material, or may make contact with one or more other layer(s) and/or other intermediate structure(s) already present on the substrate, and may therefore be indirectly "secured to", etc., the substrate.

While particular examples have been disclosed herein employing specific materials and/or material combinations and having particular dimensions and configurations, it should be understood that other suitable materials and/or material combinations may be employed in a range of dimensions and/or configurations while remaining within the scope of inventive concepts disclosed and/or claimed herein.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

What is claimed is:

1. An apparatus, comprising:
   a substrate having a recessed area on a surface thereof; and
   a heat sink comprising heat sink material deposited within the recessed area, the heat sink material having thermal conductivity greater than thermal conductivity of the substrate,
   wherein the substrate comprises silicon, and the heat sink material comprises diamond.

2. The apparatus of claim 1, further comprising a heat-generating device mounted on the substrate in thermal contact with the heat sink.

3. An apparatus, comprising;
   a substrate having a recessed area on a surface thereof;
   a heat sink comprising heat sink material deposited within the recessed area, the heat sink material having thermal conductivity greater than thermal conductivity of the substrate; and
   a planar optical waveguide formed on the substrate and positioned so as to enable optical coupling between the planar optical waveguide and an optical device mounted on the substrate in thermal contact with the heat sink.

4. The apparatus of claim 3, further comprising an electrical contact formed on the substrate and positioned so as to establish electrical continuity with an optical device mounted on the substrate optically coupled to the planar optical waveguide and in thermal contact with the heat sink.

5. The apparatus of claim 4, wherein the electrical contact is positioned on at least a portion of the heat sink surface so as to provide thermal contact between the heat sink and an optical device mounted on the substrate.

6. The apparatus of claim 5, further comprising solder for establishing electrical continuity between the optical device and the electrical contact and thermal contact between the optical device and the heat sink.

7. The apparatus of claim 4, further comprising an optical device mounted on the substrate optically coupled to the planar optical waveguide, in thermal contact with the heat sink, and with electrical continuity established with the electrical contact.

8. The apparatus of claim 3, further comprising an optical device mounted on the substrate in thermal contact with the heat sink and positioned for optical coupling with the planar optical waveguide.

9. The apparatus of claim 3, wherein the substrate includes a low-index optical buffer layer on the surface thereof, the optical buffer layer leaving exposed at least a portion of a surface of the heat sink.

10. The apparatus of claim 3, wherein the heat sink has a substantially flat surface substantially flush with the surface of the substrate.

11. An apparatus, comprising:
    a substrate having a recessed area on a surface thereof; and
    a heat sink comprising heat sink material deposited within the recessed area, the heat sink material having thermal conductivity greater than thermal conductivity of the substrate,
    wherein the substrate comprises silicon with a silica optical buffer layer on the surface thereof, and the heat sink material comprises diamond.

12. A method comprising:
    forming a recessed area on a surface of a substrate; and
    depositing heat sink material within the recessed area to form a heat sink, the heat sink material having thermal conductivity greater than thermal conductivity of the substrate,
    wherein the substrate comprises silicon with a silica optical buffer layer on the surface thereof, and the heat sink material comprises diamond.

13. A method, comprising:
    forming multiple recessed areas on a surface of a substrate wafer; and
    depositing heat sink material within the multiple recessed areas to form multiple corresponding heat sinks, the heat sink material having thermal conductivity greater than thermal conductivity of the substrate wafer,
    wherein the substrate wafer comprises silicon with a silica optical buffer layer on the surface thereof, and the heat sink material comprises diamond.

14. A method, comprising:

forming multiple recessed areas on a surface of a substrate wafer; and depositing heat sink material within the multiple recessed areas to form multiple corresponding heat sinks, the heat sink material having thermal conductivity greater than thermal conductivity of the substrate wafer, wherein the substrate wafer comprises silicon, and the heat sink material comprises diamond.

15. A method comprising:

forming a recessed area on a surface of a substrate;

depositing heat sink material within the recessed area to form a heat sink, the heat sink material having thermal conductivity greater than thermal conductivity of the substrate; and forming a planar optical waveguide on the substrate positioned so as to enable optical coupling between the planar optical waveguide and an optical device mounted on the substrate in thermal contact with the heat sink.

16. The method of claim 15, further comprising forming an electrical contact on the substrate positioned so as to establish electrical continuity with an optical device mounted on the substrate optically coupled to the planar optical waveguide and in thermal contact with the heat sink.

17. The method of claim 16, wherein the electrical contact is positioned on at least a portion of the heat sink surface so as to provide thermal contact between the heat sink and an optical device mounted on the substrate.

18. The method of claim 17, further comprising applying solder for establishing electrical continuity between the optical device and the electrical contact and thermal contact between the optical device and the heat sink.

19. The method of claim 16, further comprising mounting an optical device on the substrate optically coupled to the planar optical waveguide, in thermal contact with the heat sink, and with electrical continuity established with the electrical contact.

20. The method of claim 15, further comprising polishing the substrate and the heat sink material to form a substantially flat surface of the heat sink substantially flush with the surface of the substrate.

21. The method of claim 15, further comprising forming a low-index optical buffer layer on the surface of the substrate, while leaving exposed at least a portion of a surface of the heat sink.

22. The method of claim 15, further comprising mounting an optical device on the substrate in thermal contact with the heat sink and positioned for optical coupling with the planar optical waveguide.

23. A method comprising:

forming a recessed area on a surface of a substrate; and depositing heat sink material within the recessed area to form a heat sink, the heat sink material having thermal conductivity greater than thermal conductivity of the substrate, wherein the substrate comprises silicon, and the heat sink material comprises diamond.

24. The method of claim 23, further comprising mounting a heat-generating device onto the substrate in thermal contact with the heat sink.

25. A method, comprising:

forming multiple recessed areas on a surface of a substrate wafer;

depositing heat sink material within the multiple recessed areas to form multiple corresponding heat sinks, the heat sink material having thermal conductivity greater than thermal conductivity of the substrate wafer; and forming multiple planar optical waveguides on the substrate wafer positioned so as to enable optical coupling between one of the planar optical waveguides and an optical device mounted on the substrate wafer in thermal contact with a corresponding one of the multiple heat sinks.

26. The method of claim 25, further comprising forming multiple electrical contacts on the substrate wafer positioned so as to establish electrical continuity with an optical device mounted on the substrate wafer in thermal contact with a corresponding one of the multiple heat sinks.

27. The method of claim 26, wherein the multiple electrical contacts are positioned on at least a portion of surfaces of the corresponding heat sinks so as to provide thermal contact between the corresponding heat sink and an optical device mounted on the substrate wafer.

28. The method of claim 27, further comprising applying solder for establishing electrical continuity between optical devices and the multiple electrical contacts and thermal contact between optical devices and the multiple heat sinks.

29. The method of claim 26, further comprising:

dividing the substrate wafer into multiple substrate segments, each having at least one corresponding heat sink and at least one corresponding electrical contact; and mounting corresponding optical devices on the substrate segments optically coupled to the corresponding planar optical waveguides, in thermal contact with the corresponding heat sinks, and with electrical continuity established with the corresponding electrical contacts.

30. The method of claim 25, further comprising polishing the substrate wafer and the heat sink material to form substantially flat surfaces of the multiple heat sinks substantially flush with the surface of the substrate wafer.

31. The method of claim 25, further comprising:

dividing the substrate wafer into multiple substrate segments, each having at least one corresponding heat sink and at least one corresponding planar waveguide; and mounting corresponding optical devices on the substrate segments in thermal contact with the corresponding heat sink and positioned for optical coupling with the corresponding planar optical waveguide.

32. The method of claim 25, further comprising forming a low-index optical buffer layer on the surface of the substrate wafer, while leaving exposed at least portions or surfaces of the multiple heat sinks.

* * * * *